(12) United States Patent
Sugimoto (10) Patent No.: US 11,643,989 B2
(45) Date of Patent: May 9, 2023

(54) DETERMINATION DEVICE AND DETERMINATION METHOD FOR INTERNAL COMBUSTION ENGINE

(71) Applicant: TOYOTA JIDOSHA KABUSHIKI KAISHA, Aichi-ken (JP)

(72) Inventor: Hitoki Sugimoto, Toyota (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 17/497,984

(22) Filed: Oct. 11, 2021

(65) Prior Publication Data

US 2022/0120231 A1 Apr. 21, 2022

(30) Foreign Application Priority Data

Oct. 15, 2020 (JP) .............................. JP2020-173701

(51) Int. Cl.
*F02D 41/00* (2006.01)
*F02D 41/14* (2006.01)
*F02D 41/38* (2006.01)
*G01M 15/11* (2006.01)

(52) U.S. Cl.
CPC ..... *F02D 41/0087* (2013.01); *F02D 41/1475* (2013.01); *F02D 41/1498* (2013.01); *F02D 41/38* (2013.01); *G01M 15/11* (2013.01); *F02D 2200/1015* (2013.01)

(58) Field of Classification Search
CPC ............. F02D 41/0087; F02D 41/1475; F02D 41/1498; F02D 41/38; F02D 2200/1015; F02D 41/0002; F02D 41/3094; G01M 15/11
See application file for complete search history.

(56) References Cited

U.S. PATENT DOCUMENTS

| 6,634,220 B1 | 10/2003 | Amano | |
|---|---|---|---|
| 2006/0112932 A1* | 6/2006 | Toyoda | F02D 41/1498 123/690 |
| 2008/0295487 A1* | 12/2008 | Binder | F01N 9/005 60/277 |
| 2013/0030671 A1* | 1/2013 | Hoshi | F02D 19/0615 701/104 |
| 2014/0316680 A1* | 10/2014 | Takahashi | F02D 41/0002 701/104 |

FOREIGN PATENT DOCUMENTS

| JP | 2001107799 A | 4/2001 | |
|---|---|---|---|
| JP | 2007187076 A | * 7/2007 | |
| JP | 2007263056 A | * 10/2007 | ............ F01N 13/011 |

* cited by examiner

*Primary Examiner* — Joseph J Dallo
(74) *Attorney, Agent, or Firm* — Hauptman Ham, LLP (57) ABSTRACT

A determination device for an internal combustion engine executes a partial fuel cut-off process. The determination device determines that exhaust gas characteristics have deteriorated when the misfire rate of the internal combustion engine is greater than or equal to a determination threshold. The determination device sets the determination threshold to a first determination threshold when the calculated misfire rate is a misfire rate in a period of non-execution of the partial fuel cut-off process. Also, the determination device sets the determination threshold to a second determination threshold, which is less than the first determination threshold, when the calculated misfire rate is a misfire rate in a period of execution of the partial fuel cut-off process.

5 Claims, 8 Drawing Sheets

DETERMINATION DEVICE AND DETERMINATION METHOD FOR INTERNAL COMBUSTION ENGINE

RELATED APPLICATIONS

The present application claims priority of Japanese Application Number 2020-173701 filed on Oct. 15, 2020, the disclosure of which is hereby incorporated by reference herein in its entirety.

BACKGROUND

1. Field

The present disclosure relates to a determination device and a determination method for an internal combustion engine.

2. Description of Related Art

Japanese Laid-Open Patent Publication No. 2001-107799 discloses a device that determines that there is an anomaly in an internal combustion engine when a misfire rate of the internal combustion engine is greater than or equal to a threshold.

The occurrence of a misfire in an internal combustion engine increases the amount of unburned fuel flowing into the exhaust system, which is likely to cause exhaust gas characteristics to deteriorate. Therefore, when the misfire rate is greater than or equal to the threshold, it can be determined that the exhaust gas characteristics have deteriorated beyond an allowable range.

However, since the internal combustion engine has multiple operation modes, the exhaust gas characteristics may have deteriorated beyond the allowable range even if the misfire rate is less than the threshold, depending on the operation mode of the internal combustion engine.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a first general aspect, a determination device for an internal combustion engine including cylinders is provided. The determination device includes processing circuitry that is configured to execute a partial fuel cut-off process, a misfire detection process, a calculating process, a determination process, and a threshold setting process. The partial fuel cut-off process includes a stopping process that stops a combustion operation for air-fuel mixture in one or some of the cylinders, and an increasing process that increases, at execution of the combustion operation for air-fuel mixture in remaining cylinders other than the one or some of the cylinders, an amount of fuel supplied to combustion chambers of the remaining cylinders as compared to that in non-execution of the stopping process. The misfire detection process detects misfires in the cylinders. The calculating process calculates a misfire rate. The misfire rate represents a ratio of a number of times misfires have been detected by the misfire detection process to a number of times the combustion operation has been performed in the cylinders. The determination process determines that exhaust gas characteristics have deteriorated when the misfire rate is greater than or equal to a determination threshold. The threshold setting process sets the determination threshold to a first determination threshold when the calculated misfire rate is a misfire rate in a period of non-execution of the partial fuel cut-off process, and a second determination threshold, which is less than the first determination threshold, when the calculated misfire rate is a misfire rate in a period of execution of the partial fuel cut-off process.

During the execution of the partial fuel cut-off process, the above-described configuration increases the amount of fuel supplied to the combustion chamber of the cylinder in which a combustion operation for air-fuel mixture is performed. Accordingly, the amount of unburned fuel flowing into the exhaust system increases when a misfire occurs. Thus, even if the misfire rate is the same between execution and non-execution of the partial fuel cut-off process, the exhaust gas characteristics are more likely to deteriorate during the execution of the partial fuel cut-off process.

However, in the above-described configuration, during the execution of the partial fuel cut-off process, in which the occurrence of a misfire is likely to cause the exhaust gas characteristics to deteriorate, the determination threshold is set to be less than the determination threshold during the non-execution of the partial fuel cut-off process. Thus, during the execution of the partial fuel cut-off process, even if the misfire rate is relatively low, the misfire rate is prevented from erroneously determined to be less than the determination threshold. Therefore, even if the partial fuel cut-off process is executed, it is possible to properly determine deterioration of the exhaust gas characteristics.

In a second general aspect, a determination device for an internal combustion engine including cylinders is provided. The determination device includes processing circuitry that is configured to execute a partial fuel cut-off process, a misfire detection process, a calculating process, a determination process, and a threshold setting process. The partial fuel cut-off process includes a stopping process that stops a combustion operation for air-fuel mixture in one or some of the cylinders, and an increasing process that increases, at execution of the combustion operation for air-fuel mixture in remaining cylinders other than the one or some of the cylinders, an amount of fuel supplied to combustion chambers of the remaining cylinders as compared to that in non-execution of the stopping process. The misfire detection process detects misfires in the cylinders. The calculating process calculates a misfire rate, the misfire rate representing a ratio of a number of times misfires have been detected by the misfire detection process to a number of times the combustion operation has been performed in the cylinders. The determination process determines that exhaust gas characteristics have deteriorated when the misfire rate is greater than or equal to a determination threshold. The threshold setting process changes the determination threshold in accordance with a ratio between a number of times misfires have been detected during execution of the partial fuel cut-off process and a number of times misfires have been detected during non-execution of the partial fuel cut-off process. The threshold setting process sets the determination threshold such that a value of the determination threshold decreases in accordance with an increase in a ratio of the number of times misfires have been detected during the execution of the partial fuel cut-off process to the number of times misfires have been detected by the misfire detection process.

In a third general aspect, a determination method for an internal combustion engine including cylinders is provided.

The determination method includes: executing a partial fuel cut-off process including a stopping process that stops a combustion operation for air-fuel mixture in one or some of the cylinders, and an increasing process that increases, at execution of the combustion operation for air-fuel mixture in remaining cylinders other than the one or some of the cylinders, an amount of fuel supplied to combustion chambers of the remaining cylinders as compared to that in non-execution of the stopping process; detecting misfires in the cylinders; calculating a misfire rate, the misfire rate representing a ratio of a number of times misfires have been detected to a number of times the combustion operation has been performed in the cylinders; determining that exhaust gas characteristics have deteriorated when the misfire rate is greater than or equal to a determination threshold; setting the determination threshold to a first determination threshold when the calculated misfire rate is a misfire rate in a period of non-execution of the partial fuel cut-off process; and setting the determination threshold to a second determination threshold, which is less than the first determination threshold, when the calculated misfire rate is a misfire rate in a period of execution of the partial fuel cut-off process.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

First Embodiment

A determination device for an internal combustion engine 10 according to a first embodiment will now be described with reference to the drawings.

Figure 1:
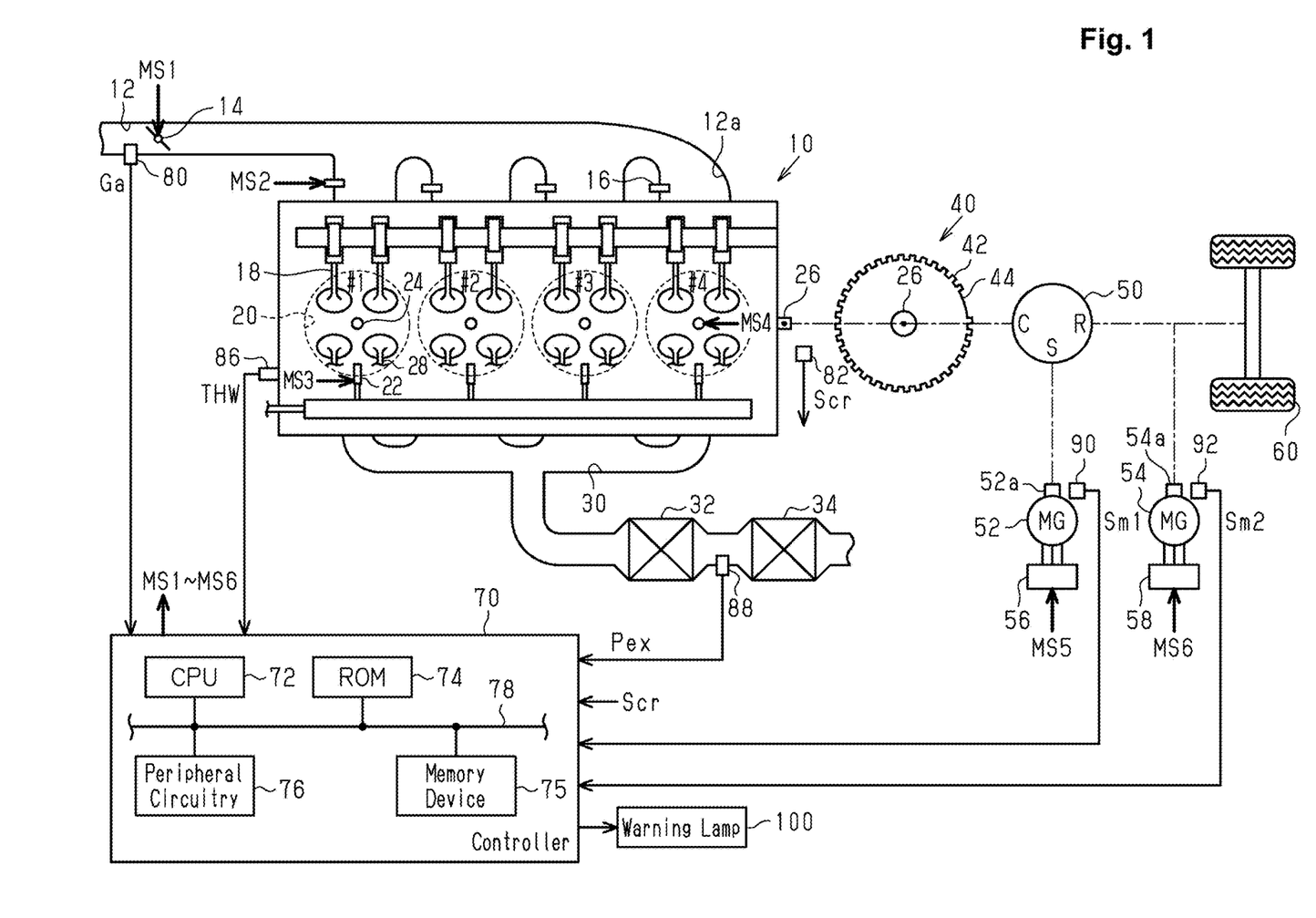
FIG. 1 is a diagram showing the configuration of a drivetrain and a controller according to a first embodiment.

As shown in FIG. 1, the internal combustion engine 10 includes four cylinders, which are first to fourth cylinder #1 to #4. An intake passage 12 of the internal combustion engine 10 incorporates a throttle valve 14. The intake passage 12 includes intake ports 12*a* in a downstream section. Each intake port 12*a* is provided with a port injection valve 16, which injects fuel into the intake port 12*a*. In each of the first to fourth cylinders #1 to #4, air drawn into the intake passage 12 and fuel injected from the port injection valve 16 flow into a combustion chamber 20 when an intake valve 18 is opened. A direct injection valve 22 injects fuel into the combustion chamber 20. Air-fuel mixture in the combustion chamber 20 is burned by spark discharge of an ignition plug 24. Combustion energy generated by combustion is converted into rotational energy of a crankshaft 26.

The air-fuel mixture burned in the combustion chambers 20 is discharged to an exhaust passage 30 as exhaust gas when exhaust valves 28 open. The exhaust passage 30 is provided with a three-way catalyst 32, which has an oxygen storage capacity, and a gasoline particulate filter (GPF) 34. In the present embodiment, the GPF 34 supports a three-way catalyst that traps particulate matter (PM).

A crank rotor 40 having teeth 42 is coupled to the crankshaft 26. The teeth 42 indicate respective rotation angles of the crankshaft 26. The teeth 42 are basically arranged at 10° CA intervals on the crank rotor 40. The crank rotor 40 also has a toothless section 44, at which the interval between the adjacent teeth 42 is 30° CA. The toothless section 44 indicates a referential rotation angle of the crankshaft 26.

The crankshaft 26 is mechanically coupled to a carrier C of a planetary gear mechanism 50, which is part of a power splitter. The planetary gear mechanism 50 includes a sun gear S, which is mechanically coupled to a rotary shaft 52*a* of a first motor-generator 52. The planetary gear mechanism 50 includes a ring gear R, which is mechanically coupled to a rotary shaft 54*a* of a second motor-generator 54 and to driven wheels 60. Alternating-current voltage of an inverter 56 is applied to terminals of the first motor-generator 52. Also, alternating-current voltage of an inverter 58 is applied to terminals of the second motor-generator 54.

A controller 70 controls the internal combustion engine 10. The controller 70 operates operated units of the internal combustion engine 10, such as the throttle valve 14, the port injection valves 16, the direct injection valves 22, and the ignition plugs 24, thereby controlling torque and the ratios of exhaust components, which are controlled variables of the internal combustion engine 10. Also, the controller 70 controls the first motor-generator 52 and the second motor-generator 54. The controller 70 operates the inverter 56, thereby controlling the rotation speed, which is a controlled variable of the first motor-generator 52. Further, the controller 70 operates the inverter 58, thereby controlling torque, which is a controlled variable of the second motor-generator 54. FIG. 1 shows operation signals MS1 to MS6 respectively corresponding to the throttle valve 14, the port injection valves 16, the direct injection valves 22, the ignition plugs 24, and the inverters 56, 58.

To control controlled variables of the internal combustion engine 10, the controller 70 refers to an intake air amount Ga detected by an air flow meter 80, an output signal Scr of a crank angle sensor 82, a coolant temperature THW detected by a coolant temperature sensor 86, and a pressure Pex of exhaust gas flowing into the GPF 34 detected by an exhaust pressure sensor 88. Further, to control controlled variables of the first motor-generator 52 and the second motor-generator 54, the controller 70 refers to an output signal Sm1 of a first rotation angle sensor 90, which detects a rotation angle of the first motor-generator 52, and an output signal Sm2 of a second rotation angle sensor 92, which detects a rotation angle of the second motor-generator 54.

The controller 70 includes a central processing unit (CPU) 72, a read-only memory (ROM) 74, a memory device 75, and peripheral circuitry 76, which can communicate with each other through a communication line 78. The peripheral circuitry 76 includes a circuit that generates a clock signal regulating internal operations, a power supply circuit, and a reset circuit. The controller 70 controls the controlled variables by causing the CPU 72 to execute programs stored in the ROM 74.

Figure 2:
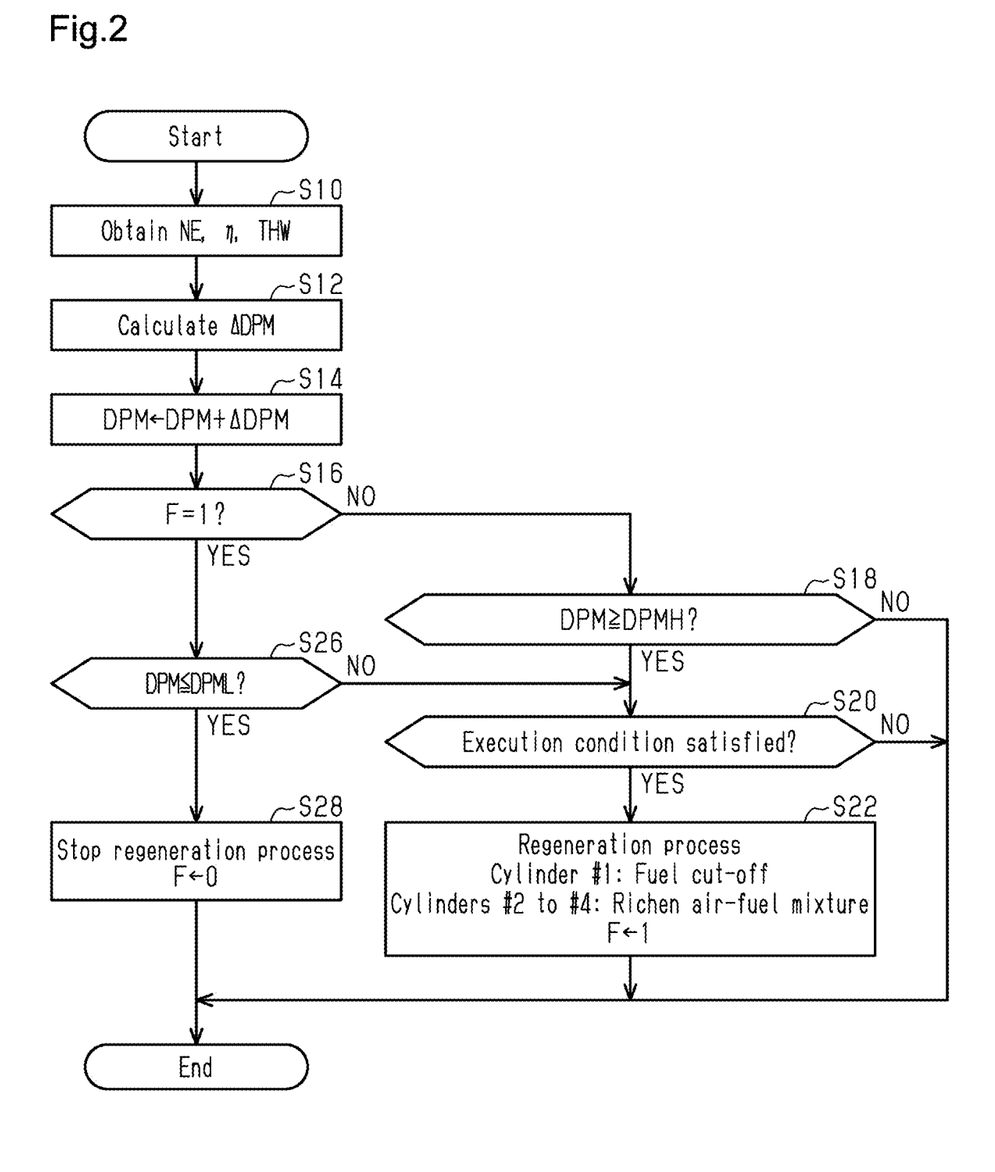
FIG. 2 is a flowchart showing a procedure of a regeneration process executed by the controller shown in FIG. 1.

FIG. 2 shows a procedure of processes executed by the controller 70 of the present embodiment. The process shown in FIG. 2 is implemented by the CPU 72 repeatedly executing programs stored in the ROM 74 at a specific interval. In the following description, the number of each step is represented by the letter S followed by a numeral.

In the series of processes shown in FIG. 2, the CPU 72 first obtains an engine rotation speed NE, a charging efficiency η, and the coolant temperature THW (S10). The engine rotation speed NE is calculated by the CPU 72 based on the output signal Scr. The charging efficiency η is calculated by the CPU 72 based on the intake air amount Ga and the engine rotation speed NE.

Next, the CPU 72 calculates an update amount ΔDPM of the accumulated amount DPM based on the engine rotation speed NE, the charging efficiency η, and the coolant temperature THW (S12). The accumulated amount DPM is the amount of PM trapped by the GPF 34. Specifically, the CPU 72 calculates the amount of PM in the exhaust gas discharged to the exhaust passage 30 based on the engine rotation speed NE, the charging efficiency and the coolant temperature THW. Also, the CPU 72 calculates the temperature of the GPF 34 based on the engine rotation speed NE and the charging efficiency η. Further, the CPU 72 calculates the update amount ΔDPM based on the amount of PM in the exhaust gas and the temperature of the GPF 34.

Next, the CPU 72 updates the accumulated amount DPM in accordance with update amount ΔDPM (S14).

Subsequently, the CPU 72 determines whether a flag F is 1 (S16). The value 1 of the flag F indicates that a regeneration process for burning and removing the PM in the GPF 34 is being executed, and the value 0 of the flag F indicates that the regeneration process is not being executed.

When determining that the flag F is 0 (S16: NO), the CPU 72 determines whether the accumulated amount DPM is greater than or equal to a regeneration execution value DPMH (S18). The regeneration execution value DPMH indicates the amount of PM trapped by the GPF 34 has increased, and is set to a value of the accumulated amount DPM at which removal of PM is desirable.

When determining that the accumulated amount DPM is greater than or equal to the regeneration execution value DPMH (S18: YES), the CPU 72 determines whether an execution condition for the regeneration process is satisfied (S20). The execution condition may be a condition that the logical conjunction of a condition (A) and a condition (B), which are shown below, is true.

Condition (A): An engine torque command value Te*, which is a command value of torque to the internal combustion engine 10, is greater than or equal to a specific value Teth.

Condition (B): The engine rotation speed NE of the internal combustion engine 10 is greater than or equal to a specific speed.

When determining that the execution condition for the regeneration process is satisfied (S20: YES), the CPU 72 executes the regeneration process and assigns 1 to the flag F (S22). As the regeneration process, the CPU 72 executes a partial fuel cut-off process, in which the combustion operation is stopped in one or some of the cylinders. The partial fuel cut-off process includes a stopping process and an increasing process.

The stopping process stops fuel injection from the port injection valve 16 and the direct injection valve 22 of the first cylinder #1, thereby stopping the combustion operation for air-fuel mixture in the first cylinder #1.

The increasing process compensates for the reduction in the engine output due to the stopping process. In the increasing process, when performing the combustion operation for air-fuel mixture in the second cylinder #2, the third cylinder #3, and the fourth cylinder #4, the amount of air and the amount of fuel supplied to the combustion chambers 20 of the cylinders #2 to #4 are increased as compared to a case of the non-execution of the stopping process. When the increasing process is executed, the amount of intake air to the combustion chambers 20 is increased through adjustment of the opening degree of the throttle valve 14, and the amount of fuel injected from the port injection valves 16 and/or the direct injection valves 22 is increased such that the air-fuel ratio of the air-fuel mixture in the combustion chambers 20 becomes richer than the stoichiometric air-fuel ratio.

The partial fuel cut-off process discharges oxygen and unburned fuel to the exhaust passage 30 in order to increase the temperature of the GPF 34, thereby burning and removing the PM trapped by the GPF 34. That is, oxygen and unburned fuel are discharged to the exhaust passage 30, so as to burn the unburned fuel in the three-way catalyst 32 and the like, thereby increasing the temperature of the GPF 34. Also, oxygen is supplied to the GPF 34, so that PM trapped by the GPF 34 is burned and removed.

When determining that the flag F is 1 in the process of S16 (S16: YES), the CPU 72 determines whether the accumulated amount DPM is less than or equal to a stopping threshold DPML (S26). The stopping threshold DPML is a value that indicates that the amount of PM trapped in the GPF 34 has been reduced sufficiently. The stopping threshold DPML is set to a value of the accumulated amount DPM at which the regeneration process can be stopped. When determining that the accumulated amount DPM is less than or equal to the stopping threshold DPML (S26: YES), the CPU 72 stops the execution of the partial fuel cut-off process in order to stop the regeneration process, and assigns 0 to the flag F (S28).

When completing the process of S22 or S28 or when making a negative determination in the process of S18 or S20, the CPU 72 temporarily suspends the series of processes shown in FIG. 2.

Figure 3:
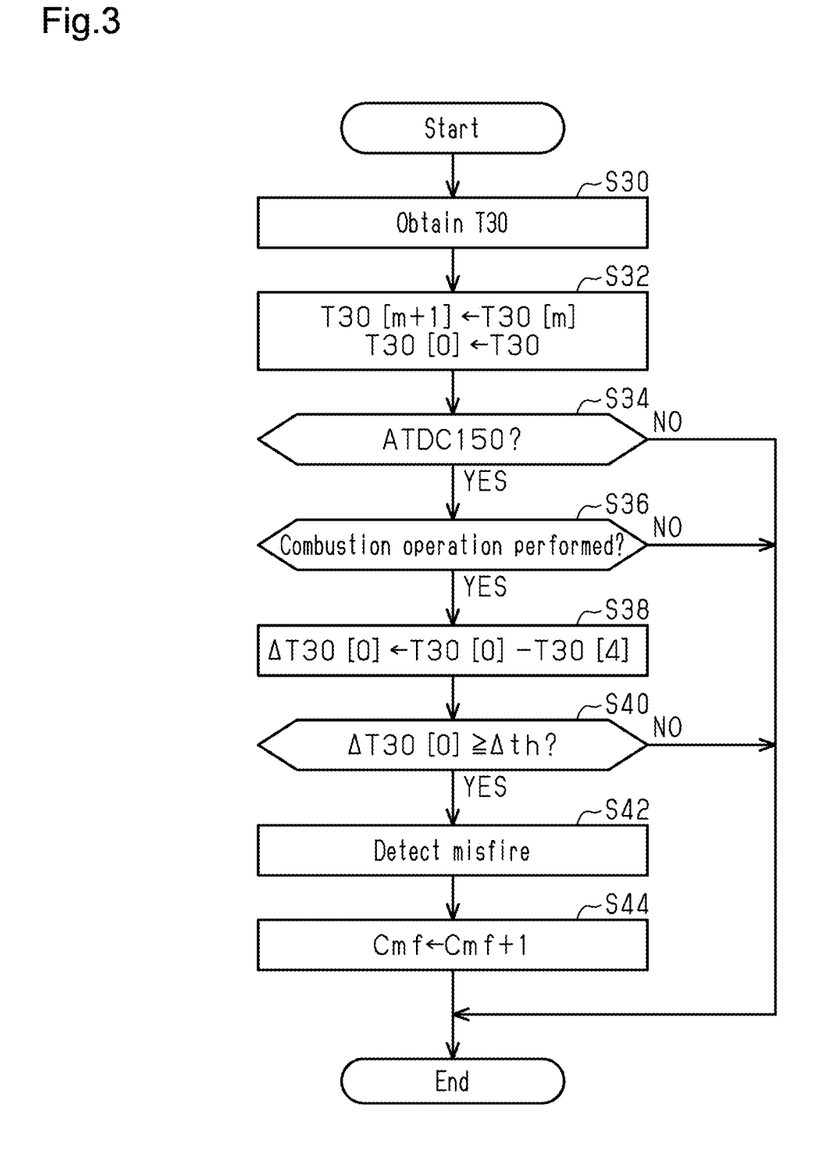
FIG. 3 is a flowchart showing a procedure of a misfire detection process executed by the controller shown in FIG. 1.

FIG. 3 shows a procedure of a misfire detection process executed by the of the controller 70. The process shown in FIG. 3 is implemented by the CPU 72 repeatedly executing programs stored in the ROM 74 at a specific interval.

In the series of processes shown in FIG. 3, the CPU 72 first obtains time T30, which is an amount of time required by the crankshaft 26 to rotate 30° CA (S30). The CPU 72 calculates the time T30 by measuring time in which the crankshaft 26 rotates 30° CA based on the output signal Scr.

Next, the CPU 72 assigns T30[$m$] to time T30[$m$+1], assigns time T30, which has been newly obtained in the process of S30(S32), to time T30[0], and stores the obtained values in the memory device 75. The variable m is an integer greater than or equal to 0, that is, 0, 1, 2, 3, .... The process of S32 causes the variable m in the bracket following the time T30 has a value that is incremented for each regression into the past. Accordingly, when the variable m in the bracket of time T30[$m$] is greater than that of another time T30[$m$] by 1, the former precedes the latter by 30° CA.

Next, the CPU 72 determines whether any of the first to fourth cylinders #1 to #4 is 150° CA after top dead center (ATDC) with respect to the compression top dead center (S34). That is, it is determined whether any of the first to fourth cylinders #1 to #4 precedes the compression top dead center by 150° CA.

When making an affirmative determination (S34: YES), the CPU 72 determines whether, in the cylinder that has been determined to be at 150° CA ATDC, the combustion operation has been performed, that is, whether fuel injection and ignition for burning air-fuel mixture have been performed (S36). In other words, the CPU 72 determines whether the cylinder that has been determined to be at 150° CA ATDC is a fuel cut-off cylinder, in which the combustion operation has been stopped by the above-described regeneration process.

When determining that the combustion operation has been performed (S36: YES), the CPU 72 selects the cylinder that has been determined to be at 150° CA ATDC as a cylinder subject to determination as to whether there is a misfire, and calculates a rotation fluctuation amounts ΔT30[0] of the cylinder subject to the determination (S38). Specifically, the CPU 72 subtracts time T30[4] from the latest time T30[0]. The time T30[4] is the time required by the crankshaft 26 to rotate 30° CA from the TDC of the cylinder subject to the determination. In a case in which there is no misfire, the time T30[0] is shorter than the time T30[4], so that the rotation fluctuation amount ΔT30[0] has a negative value. In contrast, in a case in which there is a misfire, the rotation fluctuation amount ΔT30[0] has a positive value.

Next, the CPU 72 determines whether the rotation fluctuation amount ΔT30[0] is greater than or equal to a fluctuation amount threshold Δth (S40). This process determines whether a misfire has occurred in the cylinder subject to the determination. For example, the CPU 72 may change the fluctuation amount threshold Δth in accordance with the engine rotation speed NE and/or the charging efficiency η. The parameter that defines the fluctuation amount threshold Δth is not limited to the engine rotation speed NE or a variable that represents load such as the charging efficiency η. For example, the parameter may be the sum of a past rotation fluctuation amount ΔT30 and a specific value. The past rotation fluctuation amount ΔT30 that can be used is a value of a cylinder in which the timing of the compression top dead center precedes the present time by an integral multiple of 360° CA, and in which the combustion operation has not been stopped. The specific value in this case may be changed in accordance with a variable representing the load and/or the engine rotation speed NE.

When determining that the rotation fluctuation amount ΔT30[0] is greater than or equal to the fluctuation amount threshold Δth (S40: YES), the CPU 72 determines that a misfire has occurred, thereby detecting a misfire (S42). The CPU 72 then increments a misfire counter Cmf (S44), and temporarily suspends the series of processes shown in FIG. 3.

When making a negative determination in the process of S34, 36 or S40, the CPU 72 temporarily suspends the series of processes shown in FIG. 3.

Figure 4:
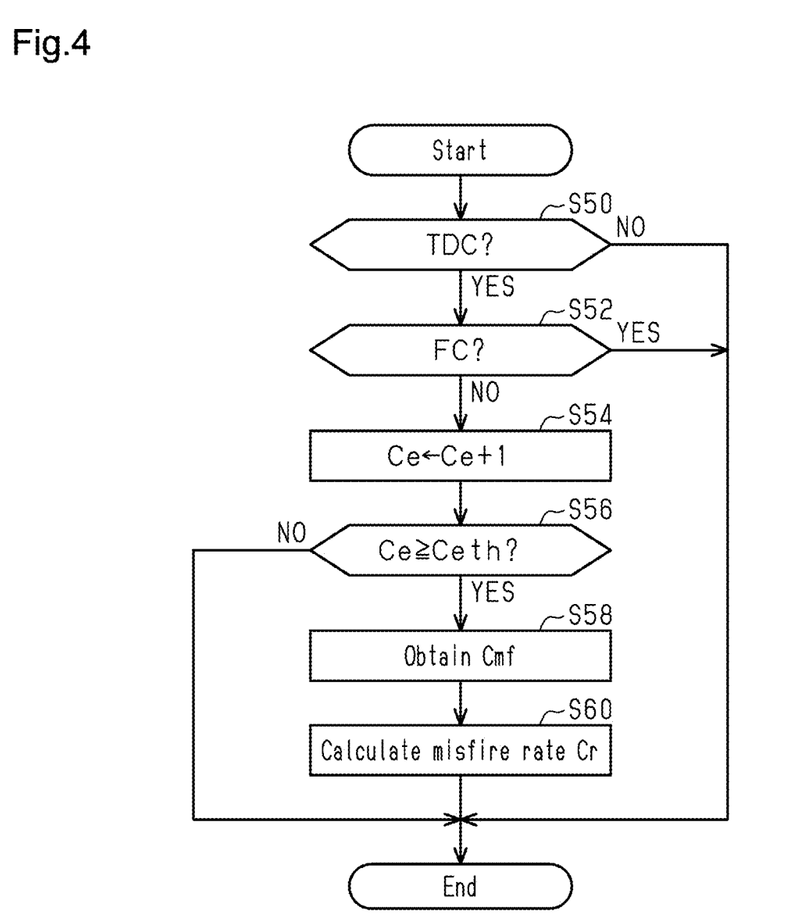
FIG. 4 is a flowchart showing a procedure of a misfire rate calculating process executed by the controller shown in FIG. 1.

FIG. 4 shows a procedure of a misfire rate calculating process executed by the of the controller 70. The process shown in FIG. 4 is implemented by the CPU 72 repeatedly executing programs stored in the ROM 74 at a specific interval.

In the series of processes shown in FIG. 4, the CPU 72 determines whether any of the first to fourth cylinders #1 to #4 is at the compression top dead center (S50). When determining that any of the cylinders is at the compression top dead center (S50: YES), the CPU 72 determines whether the regeneration process has stopped the combustion operation in that cylinder (S52). In other words, the CPU 72 determines whether the fuel cut-off process is being executed in the cylinder at the compression top dead center, that is, whether the stopping process for the combustion operation is being executed. When determining that the combustion operation is being executed (S52: NO), the CPU 72 increments an effectiveness counter Ce (S54). The value of the effectiveness counter Ce represents the number of times the combustion operation has been performed, that is, the number of times fuel injection and ignition have been executed to burn air-fuel mixture in the cylinder. The CPU 72 determines whether the effectiveness counter Ce is greater than or equal to a defined value Ceth (S56).

When determining that the effectiveness counter Ce is greater than or equal to the defined value Ceth (S56: YES), the CPU 72 obtains the current misfire counter Cmf (S58).

Next, the CPU 72 calculates a misfire rate Cr (S60). The misfire rate Cr represents the ratio of the number of times misfires have been detected by the misfire detection process to the number of times the combustion operation has been performed in the cylinders. In the present embodiment, the misfire rate Cr is a value obtained by dividing the value of the misfire counter Cmf obtained in S58 by the value of the effectiveness counter Ce at the time when an affirmative determination is made in S56 (Cr=Cmf/Ce).

When completing the process of S60, the CPU 72 temporarily suspends the series of processes shown in FIG. 4.

Figure 5:
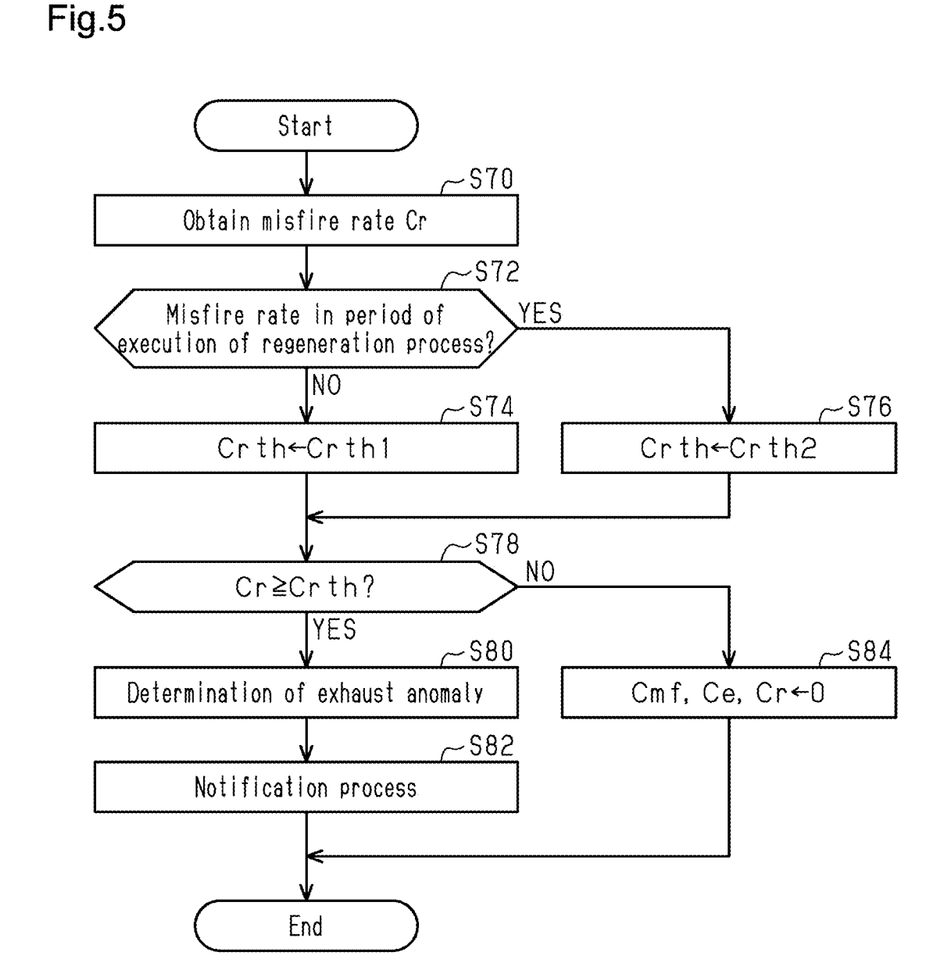
FIG. 5 is a flowchart showing a procedure of an exhaust gas characteristics determination process executed by the controller shown in FIG. 1.

FIG. 5 shows a procedure of an exhaust gas characteristics determination process executed by the controller 70. The process shown in FIG. 5 is performed by the CPU 72 executing programs stored in the ROM 74 when the misfire rate Cr is calculated in the above-described misfire rate calculating process.

In the series of processes shown in FIG. 5, the CPU 72 first obtains the calculated misfire rate Cr (S70).

Next, the CPU 72 determines whether the obtained misfire rate Cr is a misfire rate in a period of the execution of the regeneration process (S72). If the regeneration process was continuously executed during the time from when the misfire counter Cmf was initialized to when the calculation of the misfire rate Cr was performed, the CPU 72 determines that the obtained misfire rate Cra is a misfire rate in the period of the execution of the regeneration process.

When making a negative determination in S72 (S72: NO), that is, when determining that the misfire rate Cr is a misfire rate in a period of the non-execution of the regeneration process, the CPU 72 executes a threshold setting process to assign a first determination threshold Crth1 to a determination threshold Crth (S74).

The determination threshold Crth is used to determine whether the exhaust gas characteristics have deteriorated beyond a permissible range because of the occurrence of a misfire. When the misfire rate Cr is greater than or equal to the determination threshold Crth, it is determined that there is an exhaust anomaly, in which the exhaust gas characteristics have exceeded the permissible range. The first determination threshold Crth1 is a lower limit of the misfire rate Cr at which the exhaust gas characteristics may deteriorate beyond the permissible range during non-execution of the regeneration process, that is, during non-execution of the partial fuel cut-off process.

When making an affirmative determination in S72 (S72: YES), that is, when determining that the obtained misfire rate Cr is a misfire rate in the period of the execution of the regeneration process, the CPU 72 executes the threshold setting process to assign a second determination threshold Crth2 to the determination threshold Crth (S76).

The second determination threshold Crth2 is a lower limit of the misfire rate Cr at which the exhaust gas characteristics may deteriorate beyond the permissible range during execution of the regeneration process, that is, during execution of the partial fuel cut-off process. If a misfire occurs during the execution of the partial fuel cut-off process, the amount of unburned fuel flowing into the exhaust system increases as compared to the non-execution of the process. Accordingly, the exhaust gas characteristics are likely to deteriorate. Thus, during the execution of the partial fuel cut-off process, the lower limit of the misfire rate Cr is lower than that in the non-execution of the process. Therefore, the second determination threshold Crth2 is set to a value less than the first determination threshold Crth1.

After setting the determination threshold Crth in the above-described manner, the CPU 72 determines whether the misfire rate Cr obtained in S70 is greater than or equal to the determination threshold Crth (S78).

When determining that the misfire rate Cr is greater than or equal to the determination threshold Crth (S78: YES), the CPU 72 determines that there is an exhaust anomaly (S80). Then, the CPU 72 operates a warning lamp 100 shown in FIG. 1 to perform notification of an exhaust anomaly (S82).

When determining that the misfire rate Cr is less than the determination threshold Crth in S78 (S78: NO), the CPU 72 initializes the misfire counter Cmf, the effectiveness counter Ce, and the misfire rate Cr (S84).

When completing the process of step S82 or S84, the CPU 72 ends the series of processes shown in FIG. 5.

An operation and advantages of the present embodiment will now be described.

(1) When the calculated misfire rate Cr is greater than or equal to the determination threshold Crth (S78 in FIG. 5: YES), it is determined that there is an exhaust anomaly (S80). In the present embodiment, the determination threshold Crth is set in the following manner.

That is, when the misfire rate Cr is determined to be a misfire rate in the period of the non-execution of the regeneration process (S72 in FIG. 5: NO), the determination threshold Crth is set to the first determination threshold Crth1 (S74). When the misfire rate Cr is determined to be a misfire rate in the period of the execution of the regeneration process (S72 in FIG. 5: YES), the determination threshold Crth is set to the second determination threshold Crth2, which is less than the first determination threshold Crth1 (S76).

In this manner, during the execution of the regeneration process, in which the occurrence of a misfire is likely to cause the exhaust gas characteristics to deteriorate, the determination threshold Crth is set to be less than the determination threshold during the non-execution of the process. Thus, even if the misfire rate Cr is relatively low during the execution of the regeneration process, the misfire rate Cr is prevented from erroneously determined to be less than the determination threshold Crth. Therefore, even if the partial fuel cut-off process is executed as the regeneration process, deterioration of the exhaust gas characteristics is determined properly.

(2) The above-described increasing process increases the fuel injection amount such that the air-fuel ratio of the air-fuel mixture is richer than the stoichiometric air-fuel ratio. Thus, as compared to a case in which the fuel injection amount is increased in accordance with an increase in the intake air amount such that the air-fuel ratio becomes the stoichiometric air-fuel ratio, the occurrence of a misfire during the regeneration process may cause deterioration of the exhaust gas characteristics to be conspicuous. In this respect, the present embodiment changes the determination threshold Crth in the above-described manner, so that deterioration of the exhaust gas characteristics is determined properly even if the increasing process is executed.

(3) The CPU 72 executes the regeneration process of the GPF 34 when the accumulated amount DPM is greater than or equal to a threshold DPMth. Accordingly, the air drawn into the first cylinder #1 during the intake stroke is not used for combustion, but is discharged to the exhaust passage 30 during the exhaust stroke of the first cylinder #1. Also, since the air-fuel mixture in the second to fourth cylinders #2 to #4 is richer than the stoichiometric air-fuel ratio, the exhaust gas discharged to the exhaust passage 30 from the second to fourth cylinders #2 to #4 contains a large amount of unburned fuel. The oxygen discharged to the exhaust passage 30 and the unburned fuel are burned in the three-way catalyst 32 and the like, thereby increasing the temperature of the GPF 34. Also, the oxygen in the air flowing out to the exhaust passage 30 oxidizes the PM in the GPF 34. This burns and removes the PM.

Second Embodiment

A second embodiment will now be described. The differences from the first embodiment will mainly be discussed.

Figure 6:
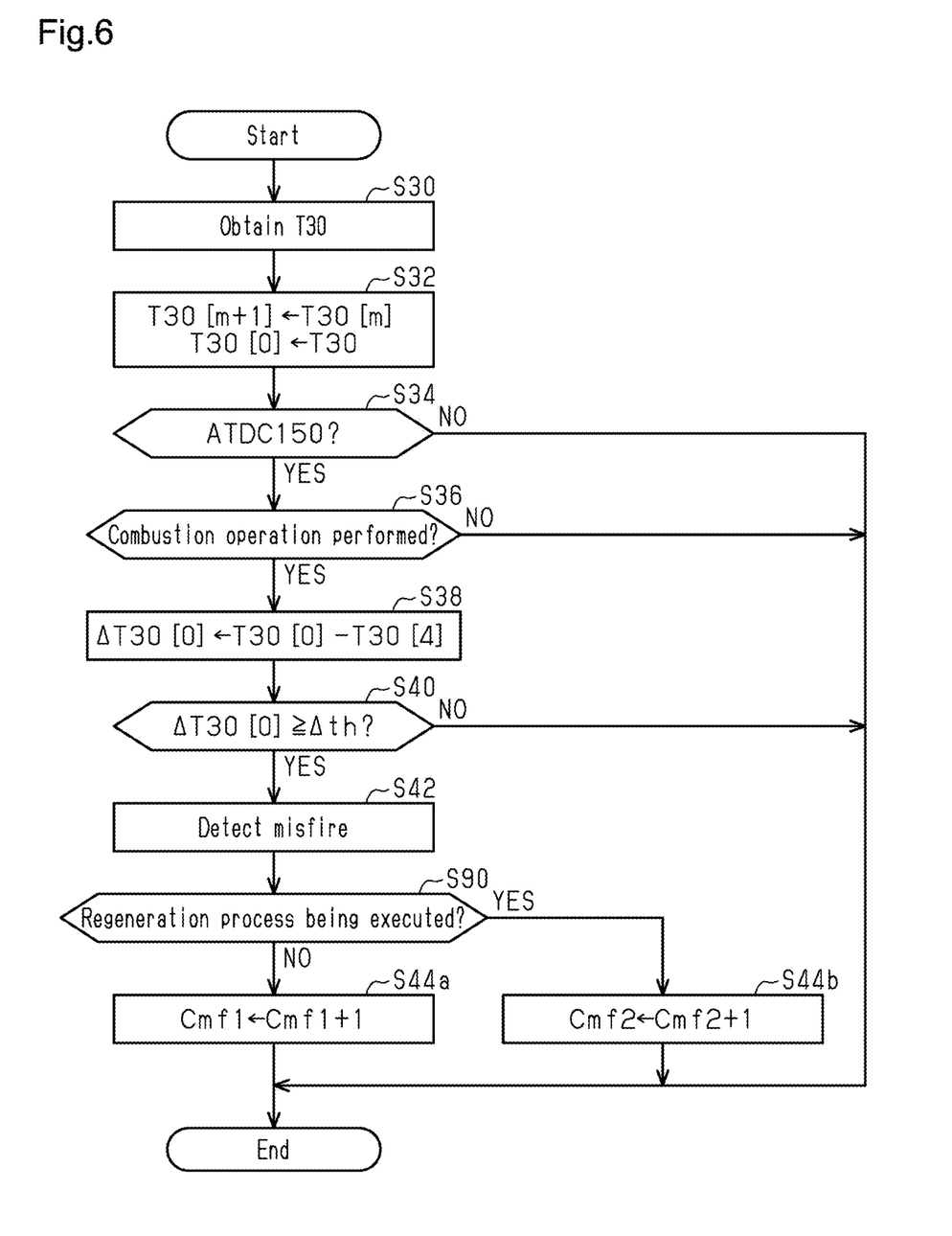
FIG. 6 is a flowchart showing a procedure of a misfire detection process executed by a controller according to a second embodiment.

FIG. 6 shows a procedure of a misfire detection process according to the present embodiment. The process shown in FIG. 6 is implemented by the CPU 72 repeatedly executing programs stored in the ROM 74 at a specific interval. In FIG. 6, the same step numbers are given to the processes that correspond to those in FIG. 3.

In the series of processes shown in FIG. 6, the CPU 72 sequentially executes the processes from S30 to S42, which have been described above.

If a misfire is detected in the process of S42, the CPU 72 determines whether the regeneration process is currently executed (S90). When determining that the regeneration process is not being executed (S90: NO), the CPU 72 increments a first misfire counter Cmf1 (S44a). The value of the first misfire counter Cmf1 represents the number of times misfires have been detected during the non-execution of the regeneration process, that is, during the non-execution of the partial fuel cut-off process.

When determining that the regeneration process is being executed in the process of S90 (S90: YES), the CPU 72 increments a second misfire counter Cmf2 (S44*b*). The value of the second misfire counter Cmf2 represents the number of times misfires have been detected during the execution of the regeneration process, that is, during the execution of the partial fuel cut-off process.

When completing the process of S44*a* or S44*b*, the CPU 72 temporarily suspends the series of processes shown in FIG. 6.

Figure 7:
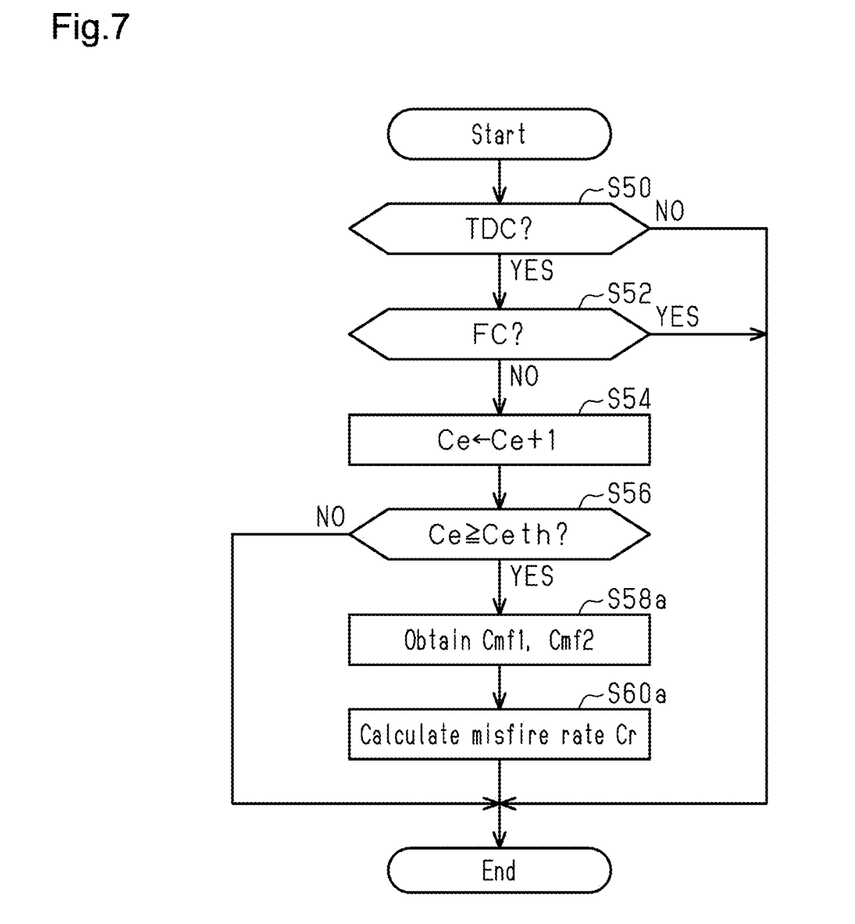
FIG. 7 is a flowchart showing a procedure of a misfire rate calculating process executed by a controller according to the second embodiment.

FIG. 7 shows a procedure of a misfire rate calculating process according to the present embodiment. The process shown in FIG. 7 is implemented by the CPU 72 repeatedly executing programs stored in the ROM 74 at a specific interval. In FIG. 7, the same step numbers are given to the processes that correspond to those in FIG. 4.

In the series of processes shown in FIG. 7, the CPU 72 sequentially executes the processes from S50 to S56, which have been described above.

When determining that the effectiveness counter Ce is greater than or equal to the defined value Ceth in the process of S56 (S56: YES), the CPU 72 obtains the current first misfire counter Cmf1 and the current second misfire counter Cmf2 (S58*a*).

Next, the CPU 72 calculates a misfire rate Cr (S60*a*). In the present embodiment, the misfire rate Cr is a value obtained by dividing the sum of the first misfire counter Cmf1 and the second misfire counter Cmf2, which are obtained in S58*a* by the value of the effectiveness counter Ce at the time when an affirmative determination is made at S56 (Cr=(Cmf1+Cmf2/Ce).

When completing the process of S60*a*, the CPU 72 temporarily suspends the series of processes shown in FIG. 7.

Figure 8:
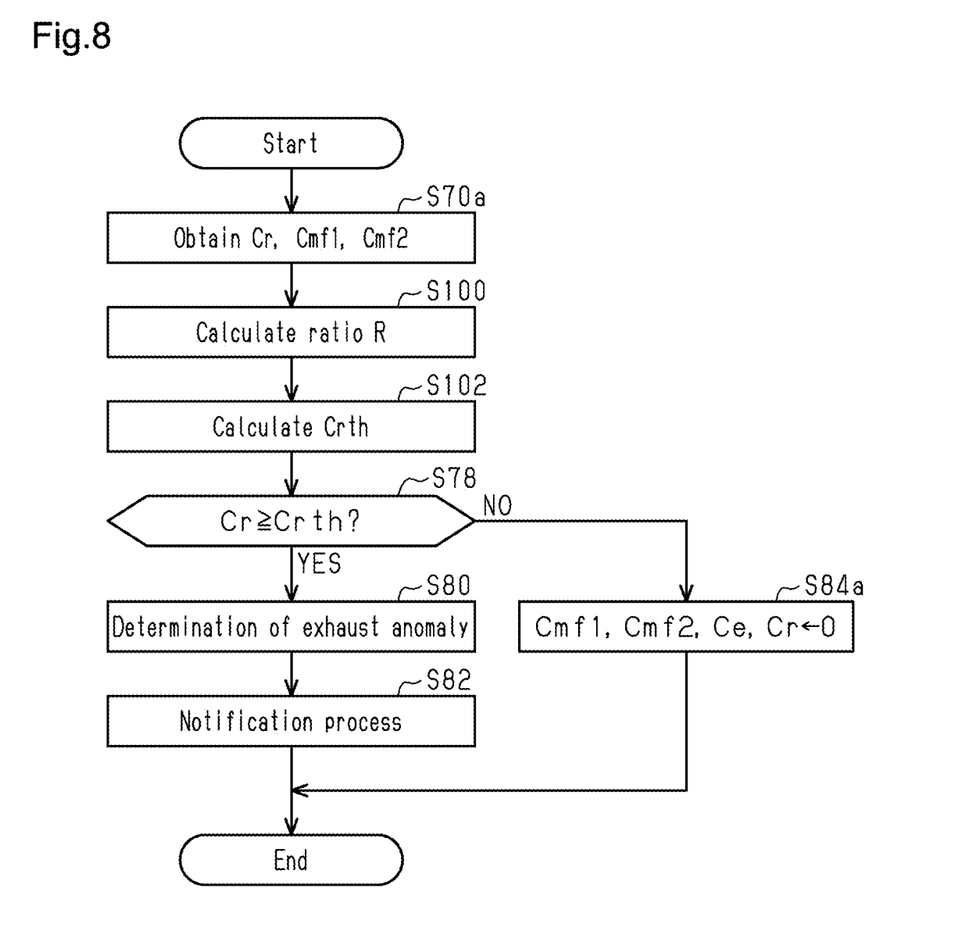
FIG. 8 is a flowchart showing a procedure of an exhaust gas characteristics determination process executed by the controller according to the second embodiment.

FIG. 8 shows a procedure of an exhaust gas characteristics determination process executed by the controller 70. The process shown in FIG. 8 is performed by the CPU 72 executing programs stored in the ROM 74 when the misfire rate Cr is calculated in the above-described misfire rate calculating process. In FIG. 8, the same step numbers are given to the processes that correspond to those in FIG. 5.

In the series of processes shown in FIG. 8, the CPU 72 first obtains the calculated misfire rate Cr, and the first misfire counter Cmf1 and the second misfire counter Cmf2 at the time of calculating the misfire rate Cr (S70*a*).

Next, the CPU 72 calculates a ratio R (S100). The ratio R is a value that changes in accordance with the ratio between the number of times misfires have been detected during the execution of the regeneration process and the number of times misfires have been detected during the non-execution of the regeneration process. The ratio R is calculated based on the values of the first misfire counter Cmf1 and the second misfire counter Cmf2, which have been obtained in S70*a*. In the present embodiment, the ratio R is a value obtained by dividing the value of the second misfire counter Cmf2 by the sum of the value of the first misfire counter Cmf1 and the value of the second misfire counter Cmf2 (R=Cmf2/(Cmf1+Cmf2). The obtained ratio R represents the ratio of the value of the second misfire counter Cmf2 to the total number of times of misfires, which is represented by the sum of the value of the first misfire counter Cmf1 and the value of the second misfire counter Cmf2. The value of the ratio R increases in accordance with an increase in the ratio of the number of times misfires have been detected during the execution of the regeneration process to the number of times misfires have been detected during the non-execution of the regeneration process. The value of (1−ratio R) represents the ratio of the value of the first misfire counter Cmf1 to the total number of times of misfires.

Next, the CPU 72 calculates the determination threshold Crth (S102). The determination threshold Crth is calculated based on the following expression (1) using the first determination threshold Crth1, the second determination threshold Crth2, and the ratio R, which have been described above.

$$Crth = (Crth2 - Crth1) \cdot R + Crth1 \qquad (1)$$

As indicated by the expression (1), the determination threshold Crth is set to the second determination threshold Crth2 when the ratio R is 1, that is, when all the misfires detected at the time when the misfire rate Cr is calculated are misfires detected during the execution of the regeneration process. In contrast, the determination threshold Crth is set to the first determination threshold Crth1 when the ratio R is 0, that is, when all the misfires detected at the time when the misfire rate Cr is calculated are misfires detected during the non-execution of the regeneration process. Further, the value of the determination threshold Crth approaches the value of the second determination threshold Crth2 as the value of the ratio R increases, that is, in accordance with an increase in the ratio of the number of times misfires have been detected during the execution of the regeneration process to the number of times misfires have been detected during the non-execution of the regeneration process.

As described above, the process of S102 is a threshold setting process that changes the determination threshold Crth in accordance with the ratio between the number of times misfires have been detected during the execution of the regeneration process (partial fuel cut-off process) and the number of times misfires have been detected during the non-execution of the regeneration process. In the threshold setting process, the first determination threshold Crth1 is the maximum value of the determination threshold Crth, and the second determination threshold Crth2 is the minimum value of the determination threshold Crth.

After setting the determination threshold Crth in the above-described manner, the CPU 72 determines whether the misfire rate Cr obtained in S70*a* is greater than or equal to the determination threshold Crth (S78).

When determining that the misfire rate Cr is greater than or equal to the determination threshold Crth (S78: YES), the CPU 72 determines that there is an exhaust anomaly (S80). Then, the CPU 72 operates a warning lamp 100 shown in FIG. 1 to perform notification of an exhaust anomaly (S82).

When determining that the misfire rate Cr is less than the determination threshold Crth in S78 (S78: NO), the CPU 72 initializes the first misfire counter Cmf1, the second misfire counter Cmf2, the effectiveness counter Ce, and the misfire rate Cr (S84*a*).

When completing the process of step S82 or S84*a*, the CPU 72 ends the series of processes shown in FIG. 8.

In the present embodiment, the determination threshold Crth may be changed in accordance with the ratio R in the process of S102. Accordingly, the determination threshold Crth is set appropriately even if the number of times misfires have been detected by the misfire detection process includes the number of times misfires have been detected during the execution of the regeneration process and the number of times misfires have been detected during the non-execution of the regeneration process.

The above-described embodiments may be modified as follows. The above-described embodiments and the following modifications can be combined as long as the combined modifications remain technically consistent with each other.

In the misfire detection process, the rotation fluctuation amount ΔT30 is a value obtained by subtracting the time T30[4], which is required by the crankshaft 26 to rotate from TDC to 30 ATDC, from the time T30[0], which is required by the crankshaft 26 to rotate from 120 ATDC to 150 ATDC. However, the present disclosure is not limited this. For example, the rotation fluctuation amount ΔT30 may be a value obtained by subtracting the time T30 required by the crankshaft 26 to rotate from TDC to 30 ATDC of the cylinder in which the compression top dead center occurred immediately before the cylinder subject to determination of a misfire from the time T30 required by the crankshaft 26 to rotate from TDC to 30 ATDC of the cylinder subject to the determination.

In the misfire detection process, the rotation fluctuation amount, which is the amount of fluctuation of the rotation speed of the crankshaft 26 in a rotation angle range (30° CA) shorter than the interval between occurrences of the compression top dead center, is quantified using the difference between the amounts of time required by the crankshaft 26 to rotate the rotation angle range. However, the rotation fluctuation amount may be quantified using the ratio of the amounts of time.

In the misfire detection process, the rotation fluctuation amount, which is the amount of fluctuation of rotation speed, is quantified using time. However, the present disclosure is not limited to this. For example, the rotation fluctuation amount may be quantified using an angular velocity.

In the misfire detection process, a misfire is detected based on the amount of fluctuation of the rotation speed of the crankshaft 26. However, the present disclosure may include an in-cylinder pressure sensor, which detects the pressure in the combustion chamber 20, and detect a misfire based on the behavior of the detected value. Alternatively, the present disclosure may detect or calculate the shaft torque of the crankshaft 26, and detect a misfire based on the behavior of the shaft torque.

In the misfire detection process shown in FIG. 3, the process of S42 may be omitted, and the process of S44 may be executed when an affirmative determination is made in S40.

In the misfire detection process shown in FIG. 6, the process of S42 may be omitted, and the process of S90 may be executed when an affirmative determination is made in S40.

The ratio R described in the second embodiment may be obtained using an expression R=Cmf1/(Cmf1+Cmf2). That is, the ratio R may represent the ratio of the value of the first misfire counter Cmf1 to the total number of times of misfires represented by the sum of the value of the first misfire counter Cmf1 and the value of the second misfire counter Cmf2. In this case, the advantages similar to those in the above-described embodiments are achieved by replacing the expression (1) with the following expression (2).

$$Crth = (Crth1 - Crth2) \cdot R + Crth2 \qquad (2)$$

In the second embodiment, the determination threshold is changed in a range between the first determination threshold, which is the maximum value, and the second determination threshold, which is the minimum value, inclusive in accordance with the ratio between the number of times misfires have been detected during the execution of the regeneration process and the number of times misfires have been detected during the non-execution of the regeneration process. However, the determination threshold may be changed in a different manner.

The specific condition for allowing the regeneration process to be executed is not limited to that described in the above-described embodiments. For example, the specific condition may include only one of the condition (A) and the condition (B). Alternatively, the specific condition may include another condition in addition to the condition (A) and the condition (B).

In the increasing process, in order to compensate for the reduction in the engine output due to the stopping process, the amount of air and the amount of fuel supplied to the combustion chambers 20 are increased for the remaining cylinders other than the fuel cut-off cylinder at the execution of combustion operation for the air-fuel mixture, as compared to the non-execution of the stopping process. Alternatively, when the reduction in the engine output due to the stopping process can be compensated for by the output of a motor-generator, the increasing process may increase only the amount of fuel.

The partial fuel cut-off process is not limited to a process that is executed as the above-described regeneration process. For example, the partial fuel cut-off process may be a process that stops supply of fuel to one or some of the cylinders in order to adjust the output of the internal combustion engine 10. Also, the partial fuel cut-off process may be a process that stops the combustion operation in one or some of the cylinders in which an anomaly has occurred. Alternatively, when the oxygen storage amount of the three-way catalyst 32 is less than or equal to a defined value, the partial fuel cut-off process may stop the combustion operation in one or some of the cylinders, and set the air-fuel ratio of the air-fuel mixture in the remaining cylinders to the stoichiometric air-fuel ratio.

In the exhaust gas characteristics determination process, the notification process is executed using the warning lamp 100 when it is determined that a misfire has occurred. However, the present disclosure is not limited to this. The notification process is not limited to a process that operates a device outputting visual information, but may be a process that operates a device outputting audio information.

The determination result of a misfire does not necessarily need to be used in the notification process. For example, when a misfire occurs, a process may be executed that operates an operated unit of the internal combustion engine 10 to switch the control of the internal combustion engine 10 to an operating state that is less likely to cause a misfire.

A process for estimating the accumulated amount DPM is not limited to that illustrated in FIG. 2. The accumulated amount DPM may be estimated based on the intake air amount Ga and the pressure difference between the upstream side and the downstream side of the GPF 34. Specifically, the accumulated amount DPM may be estimated to be larger when the pressure difference is relatively large than when the pressure difference is relatively small. Also, even if the pressure difference is the same, the accumulated amount DPM may be estimated to be larger when the intake air amount Ga is relatively small than when the intake air amount Ga. In a case in which the pressure on the downstream side of the GPF 34 is regarded to be constant, the above-described pressure Pex can be used in place of the pressure difference.

In the above-described embodiments, when the partial fuel cut-off process is executed, the number of cylinders in which the combustion operation is stopped is 1. However, the number of cylinders in which the combustion operation is stopped may be changed, up to the total number of the cylinders minus 1. Also, the cylinder in which the combustion operation is stopped does not necessarily need to be a predetermined cylinder. For example, the cylinder in which the combustion operation is stopped may be changed every combustion cycle.

The GPF 34 does not necessarily need to be a filter that supports a three-way catalyst, but may be a filter that does not support a three-way catalyst. The GPF 34 does not necessarily need to be placed on the downstream side of the three-way catalyst 32 in the exhaust passage 30. Also, an exhaust purification device that does not include the GPF 34 may be employed. For example, an exhaust purification device that includes only the three-way catalyst 32 may be employed. Even in this case, when oxygen is supplied to the three-way catalyst 32 in which the oxygen storage amount is less than or equal to a defined value by stopping the combustion operation in one or some of the cylinders, it is effective to execute the processes described in the above-described embodiments and the modifications thereof.

The controller 70 is not limited to a device that includes the CPU 72 and the ROM 74 and executes software processing. For example, the controller 70 may include a dedicated hardware circuit such as an application-specific integrated circuit (ASIC) that executes at least part of the processes executed in the above-described embodiments through hardware processing. That is, the controller 70 may be processing circuitry that has any one of the following configurations (a) to (c).

(a) Processing circuitry including a processor that executes all of the above-described processes according to programs and a program storage device such as a ROM that stores the programs.

(b) Processing circuitry including a processor and a program storage device that execute part of the above-described processes according to the programs and a dedicated hardware circuit that executes the remaining processes.

(c) Processing circuitry including a dedicated hardware circuit that executes all of the above-described processes.

The number of software processing devices that include a processor and a program storage device may be one or more, and the number of the dedicated hardware circuits may be one or more.

The vehicle is not limited to a series-parallel hybrid vehicle, but may be a parallel hybrid vehicle or a series hybrid vehicle. Further, the vehicle is not limited to a hybrid electric vehicle, but may be a vehicle that includes only the internal combustion engine 10 as a driver force generator.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A determination device for an internal combustion engine including cylinders, the determination device comprising processing circuitry that is configured to execute:
a partial fuel cut-off process including
a stopping process that stops a combustion operation for air-fuel mixture in one or some of the cylinders, and
an increasing process that increases, at execution of the combustion operation for air-fuel mixture in remaining cylinders other than the one or some of the cylinders, an amount of fuel supplied to combustion chambers of the remaining cylinders as compared to that in non-execution of the stopping process;
a misfire detection process that detects misfires in the cylinders;
a calculating process that calculates a misfire rate, the misfire rate representing a ratio of a number of times misfires have been detected by the misfire detection process to a number of times the combustion operation has been performed in the cylinders;
a determination process that determines that exhaust gas characteristics have deteriorated when the misfire rate is greater than or equal to a determination threshold; and
a threshold setting process that sets the determination threshold to
a first determination threshold when the calculated misfire rate is a misfire rate in a period of non-execution of the partial fuel cut-off process, and
a second determination threshold, which is less than the first determination threshold, when the calculated misfire rate is a misfire rate in a period of execution of the partial fuel cut-off process.

2. The determination device for the internal combustion engine according to claim 1, wherein the threshold setting process includes changing the determination threshold in a range between the first determination threshold and the second determination threshold inclusive in accordance with a ratio between a number of times misfires have been detected during the execution of the partial fuel cut-off process and a number of times misfires have been detected during the non-execution of the partial fuel cut-off process.

3. The determination device for the internal combustion engine according to claim 1, wherein the increasing process includes increasing the amount of fuel such that an air-fuel ratio of the air-fuel mixture becomes richer than a stoichiometric air-fuel ratio.

4. A determination device for an internal combustion engine including cylinders, the determination device comprising processing circuitry that is configured to execute:
a partial fuel cut-off process including
a stopping process that stops a combustion operation for air-fuel mixture in one or some of the cylinders, and
an increasing process that increases, at execution of the combustion operation for air-fuel mixture in remaining cylinders other than the one or some of the cylinders, an amount of fuel supplied to combustion chambers of the remaining cylinders as compared to that in non-execution of the stopping process;
a misfire detection process that detects misfires in the cylinders;
a calculating process that calculates a misfire rate, the misfire rate representing a ratio of a number of times misfires have been detected by the misfire detection process to a number of times the combustion operation has been performed in the cylinders;
a determination process that determines that exhaust gas characteristics have deteriorated when the misfire rate is greater than or equal to a determination threshold; and a threshold setting process that changes the determination threshold in accordance with a ratio between a number of times misfires have been detected during execution of the partial fuel cut-off process and a number of times misfires have been detected during non-execution of the partial fuel cut-off process, wherein the threshold setting process sets the determination threshold such that a value of the determination threshold decreases in accordance with an increase in a ratio of the number of times misfires have been detected during the execution of the partial fuel cut-off process to the number of times misfires have been detected by the misfire detection process.

5. A determination method for an internal combustion engine including cylinders, the determination method comprising:

executing a partial fuel cut-off process including a stopping process that stops a combustion operation for air-fuel mixture in one or some of the cylinders, and an increasing process that increases, at execution of the combustion operation for air-fuel mixture in remaining cylinders other than the one or some of the cylinders, an amount of fuel supplied to combustion chambers of the remaining cylinders as compared to that in non-execution of the stopping process;

detecting misfires in the cylinders;

calculating a misfire rate, the misfire rate representing a ratio of a number of times misfires have been detected to a number of times the combustion operation has been performed in the cylinders;

determining that exhaust gas characteristics have deteriorated when the misfire rate is greater than or equal to a determination threshold;

setting the determination threshold to a first determination threshold when the calculated misfire rate is a misfire rate in a period of non-execution of the partial fuel cut-off process; and setting the determination threshold to a second determination threshold, which is less than the first determination threshold, when the calculated misfire rate is a misfire rate in a period of execution of the partial fuel cut-off process.

\* \* \* \* \*